United States Patent [19]

Pipon

[11] Patent Number: 4,941,637
[45] Date of Patent: Jul. 17, 1990

[54] SAFETY SLIDE WITH ROLLERS FOR VEHICLE SEATS

[75] Inventor: Yves Pipon, St. Georges des Groseillers, France

[73] Assignee: A. & M. Cousin - Etablissements Cousin/Freres, France

[21] Appl. No.: 318,269

[22] Filed: Mar. 3, 1989

[30] Foreign Application Priority Data

Mar. 22, 1988 [FR] France ............................. 88 03690

[51] Int. Cl.⁵ ............................................. F16M 13/00
[52] U.S. Cl. .................................... 248/430; 296/65.1; 384/47; 384/48
[58] Field of Search ............... 248/430, 429, 424, 420; 296/65.1; 384/47, 48

[56] References Cited

U.S. PATENT DOCUMENTS

| | | | |
|---|---|---|---|
| 2,970,015 | 1/1961 | Ragsdale | 384/47 |
| 3,926,397 | 12/1975 | Hunwicks | 248/430 |
| 3,944,302 | 3/1976 | Fourrey | 384/47 |
| 4,511,187 | 4/1985 | Rees | 248/430 X |
| 4,787,667 | 11/1988 | Nishino | 248/430 X |
| 4,787,756 | 11/1988 | Pilarski | 384/47 |
| 4,809,939 | 3/1989 | Matsushima et al. | 248/430 |

FOREIGN PATENT DOCUMENTS 0905373 9/1962 United Kingdom ................ 248/430

Primary Examiner—Ramon O. Ramirez
Attorney, Agent, or Firm—Browdy and Neimark

[57] ABSTRACT

The safety slide comprises a lower fixed profile and an upper mobile profile. The lower fixed profile is of a U-shaped section and is formed with vertical wings horizontally bent for forming a lower rolling path and an upper guiding path in order to cooperate with balls. Rollers are placed between the vertical wings of the lower fixed profile and bent wings formed on the upper mobile profile with stiffening longitudinal corrugations, and are guided by vertical wings of the mobile upper profile.

3 Claims, 1 Drawing Sheet

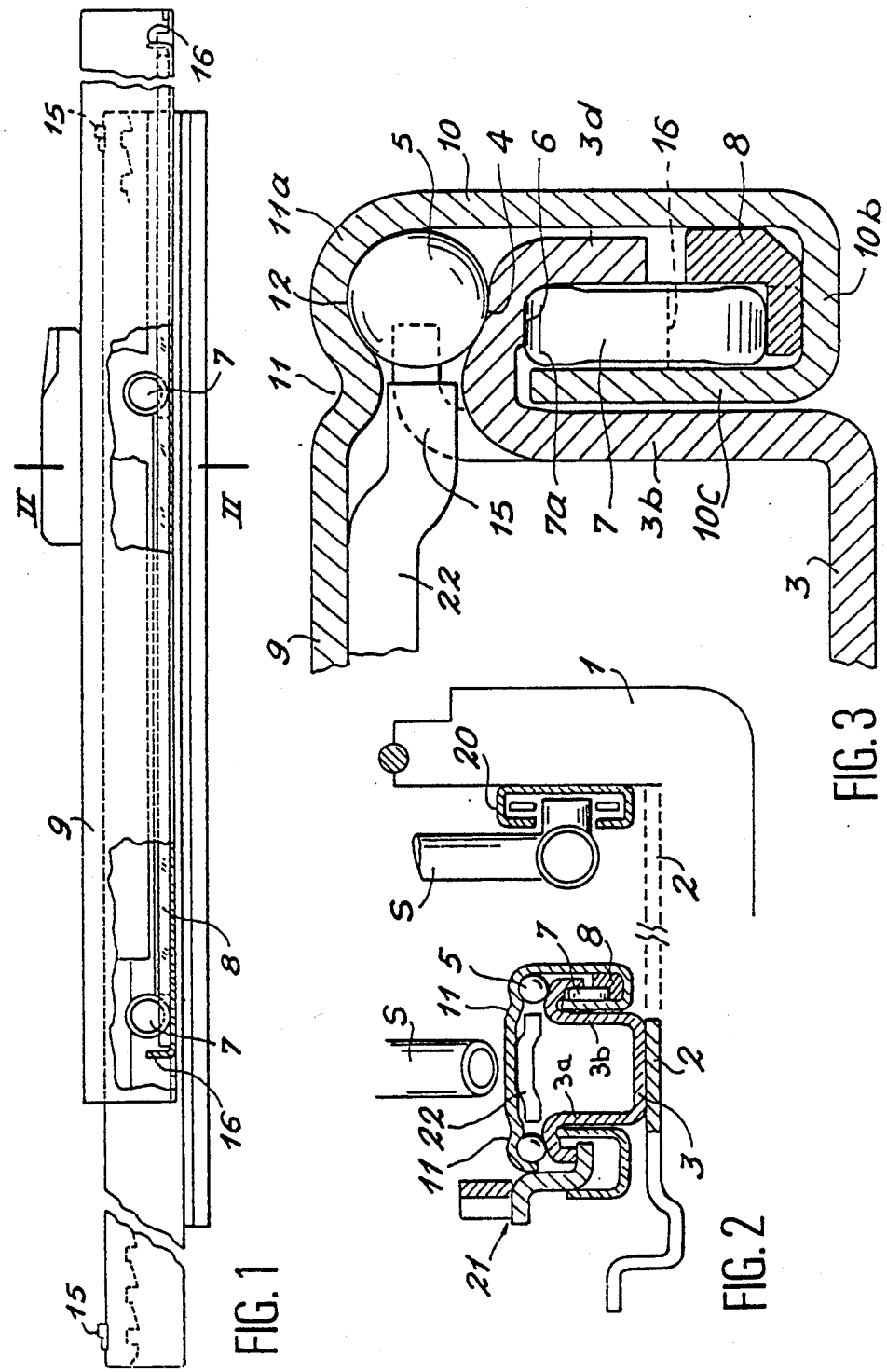

4,941,637

SAFETY SLIDE WITH ROLLERS FOR VEHICLE SEATS

FIELD OF THE INVENTION

The present invention relates to a safety slide used for the horizontal front and rear ajustment of seats in vehicles, particularly in automobile vehicules.

BACKGROUND OF THE INVENTION

First of all, it will be noted that, very often, modern vehicle integral bodies make it necessary for the slides to mount a slide vertically with respect to the floor on the seat outer side, while the seat inner side is supported by a horizontally placed slide. It thus results that the lower profile bears by its bottom on the vehicle floor and therefore supports, via various members, not only the weight of a passenger but also the efforts due to a sliding motion of the seat, which sliding motion is controlled by a declutching member of the slides, this declutching member being often placed at a top of the seat back. The effect of this arrangement is to create a considerable torsion torque and the inner horizontal slide is particularly biased and deformed, thereby creating jammings of the mobile portion with respect to the fixed portion. Thus, the seat is operated with difficulty, with a risk of being blocked in a position which is not chosen by the user and, should an impact occur, the slide, which should resist to considerable efforts, is very rapidly destroyed without absorbing a sufficient amount of energy, with an increased risk for the passenger sitting on the seat.

OBJECT AND SUMMARY OF THE INVENTION

The present invention has for its object to remedy the above disadvantages by providing, either for the two slides, or for the slide placed on the seat inner side when the outer side of said seat includes another type of slide, an element the constitution of which enables a very smooth sliding motion, without any jamming, whatever are the efforts exerted on the horizontal slide.

There is actually provided a substantial increase of the clearance between each wing of the upper profile and each wing of the lower profile, thereby avoiding a contact between the two profiles.

Moreover, extra parts, which are slightly resilient, suppress any lateral and vertical play of the slide in consideration, and finally authorizes also taking up planeity faults of the vehicle floor and even of the structures on which the slides of the seat in consideration are fixed.

According to the invention, the safety slide with rollers for vehicle seats comprising a lower fixed profile and an upper mobile profile in which the lower fixed profile is of a U-shaped section and is formed with vertical wings, the vertical wings being bent horizontally for forming a lower rolling path and an upper guiding path in order to cooperate with balls, comprises rollers placed between the vertical wings of the lower fixed profile and bent wings formed on the upper mobile profile with stiffening longitudinal corrugations, the rollers are guided, on a one hand, by vertical wings of the upper mobile profile maintaining guiding elements and, on an other hand, by the upper guiding path formed by each of the wings of the lower fixed profile so as to ensure a considerable transverse strength and a considerable tearing strength of the upper mobile profile with respect to the lower fixed profile.

Various other features of the invention will become more apparent from the hereafter detailed description.

BRIEF DESCRIPTION OF THE DRAWINGS

An embodiment of the invention is shown by way of a non limiting example in the accompanying drawings, wherein:

FIG. 1 is partly cut away side elevation view of a slide.

FIG. 2 is a cross-sectional view taken along line II—II of FIG. 1.

FIG. 3 is an enlarged view of the right hand portion of the slide of FIGS. 1 and 2.

DESCRIPTION OF A PREFERRED EMBODIMENT

Referring now to FIGS. 1 and 2, there is schematically shown the lower portion of a vehicle body 1 carrying a floor 2 which may be a support on which is attached the lower fixed profile 3 of a U-shaped section of a horizontal slide. The side wings 3a, 3b of the lower fixed profile 3 are first bent horizontally at their upper end in order to form a rolling path 4 for balls 5, and are then vertically bent at 3d so as to be substantially parallel to the vertical side wings 3a, 3b. The central lower portion of the wings 3a, 3b is conformed so as to form a guiding path 6 for rollers 7 intended for rolling by pairs on a guiding element 8 of a L-shaped section, bearing in the horizontal portion 10b of the wings 10 of the upper mobile profile 9, which is formed on its upper face, on either side of a central zone, with longitudinal corrugations 11 forming, with the rounded portions 11a following each corrugation 11 toward the outside, a guiding path 12 for the balls 5.

Finally, the wings 10 are bent vertically at 10c, parallel to the wings 3a, 3b of the lower fixed profile 3. Therefore, these end vertical portions 10c of the wings 10 can easily pass between the outer face of the wings 3a, 3b, on the one hand, and can maintain the rollers 7 on the side opposite to the guiding elements 8, on the other hand.

As shown in FIGS. 1 and 3, stops 15 limiting the displacements of the balls 5, and stops 16 limiting the displacement of the rollers 7 are also provided so that the upper profile 9 of the horizontal slide cannot extend beyond a well defined front and rear distance according to the type of vehicle in consideration.

The seat which is schematically shown in FIG. 2 at S is carried outside on a vertical slide 20 of any type and constitution but which has a fixed portion which is fixed to the lower portion of the vehicle body 1.

Thus, the largest portions of both the transverse efforts and of the tearing-off efforts are absorbed by the inner horizontal slide which, due to its constitution as such, can perfectly resist these efforts. Actually, on the one hand, the wings 3a, 3b of the lower fixed profile 3 and the wings 10 of the upper profile 9, on the other hand, are conformed so as to provide an excellent resistance, but also this resistance is increased due to the guiding elements 8 placed at the lower portion of the ends of the mobile profile 9 cooperating with the rollers 7.

The latch 21, which is of any known-type, enables to maintain the upper mobile profile 9 in the chosen position with respect to the lower fixed profile 3.

Moreover, a top of the profile 9 is reinforced, first by the longitudinal corrugations 11, and secondly by a cross-bar 22 (see FIGS. 2 and 3) cooperating with the stops 15 limiting the displacement of the balls 5 underneath the profile 9.

It should be noted that the rollers 7—which, generally, are each provided with a circular jutting-out enlargement 7a—and the guiding paths 8 are most often made of an appropriate plastics material, by moulding or any other similar process.

The constitution of the rollers 7 and guiding paths 8 in an appropriate plastics material, which is generally slightly resilient, has as an object to completely take-up the vertical and lateral clearances which the slide in consideration could exhibit and, moreover, enables a taking up of the planeity faults of the vehicle floor or that of the vehicle structure on which is mounted the slide in consideration.

What is claimed is:

1. A safety slide for vehicle seats comprising a lower fixed profile and an upper mobile profile, wherein the upper mobile profile has stiffening longitudinal corrugations, and the lower fixed profile is of a U-shaped section and is formed with vertical wings, said vertical wings being extended by horizontally bent portions and then vertically bent portions for forming, with the stiffening longitudinal corrugations of the upper mobile profile, an upper guiding path for balls and forming a lower rolling path for rollers placed between: (i) said vertically bent portions of the vertical wings of said lower fixed profile, (ii) corresponding vertically bent wing portions formed on the upper mobile profile, and (iii) guiding elements placed in bottom of the upper mobile profile, whereby said rollers are guided, on a one hand, by said vertically bent wing portions of the upper mobile profile and said guiding elements and, on an other hand, by the lower rolling path formed by the wings of the lower fixed profile so as to ensure a considerable transverse strength and a considerable tearing strength of the upper mobile profile with respect to the lower fixed profile.

2. The slide as set forth in claim 1, wherein said rollers and said guiding elements are made of an appropriate plastics material.

3. The slide as set forth in claim 1, wherein said rollers and said guiding elements are made by moulding.

* * * * *